United States Patent [19]

Sigety, Jr.

[11] Patent Number: 4,491,901
[45] Date of Patent: Jan. 1, 1985

[54] SUPPORT DEVICE FOR A VEHICLE HEADLAMP

[75] Inventor: Stephen Sigety, Jr., Mt. Clemens, Mich.

[73] Assignee: General Motors Corporation, Detroit, Mich.

[21] Appl. No.: 543,610

[22] Filed: Oct. 20, 1983

[51] Int. Cl.³ .............................................. F21V 21/28
[52] U.S. Cl. ..................................... 362/275; 313/113; 362/80; 362/83; 362/287; 362/289; 362/368; 362/396; 362/418; 362/428
[58] Field of Search ..................... 313/113; 362/80, 83, 362/275, 287, 289, 368, 396, 418, 428

[56] References Cited

U.S. PATENT DOCUMENTS

| 4,412,274 | 10/1983 | McMahan et al. | 362/289 X |
| 4,412,275 | 10/1983 | McMahan | 362/289 X |
| 4,414,614 | 11/1983 | McMahan et al. | 362/289 X |
| 4,415,956 | 11/1983 | McMahan | 362/289 X |

Primary Examiner—Stephen J. Lechert, Jr.
Attorney, Agent, or Firm—Edward J. Biskup

[57] ABSTRACT

A support device for a vehicle headlamp that consists of a wire shaped so as to have a gripping engagement with the peripheral portion of the headlamp adjacent the lens and that includes formed wire sections which rotatably carry adjusting screws which connect the support device to a frontal portion of the vehicle.

3 Claims, 8 Drawing Figures

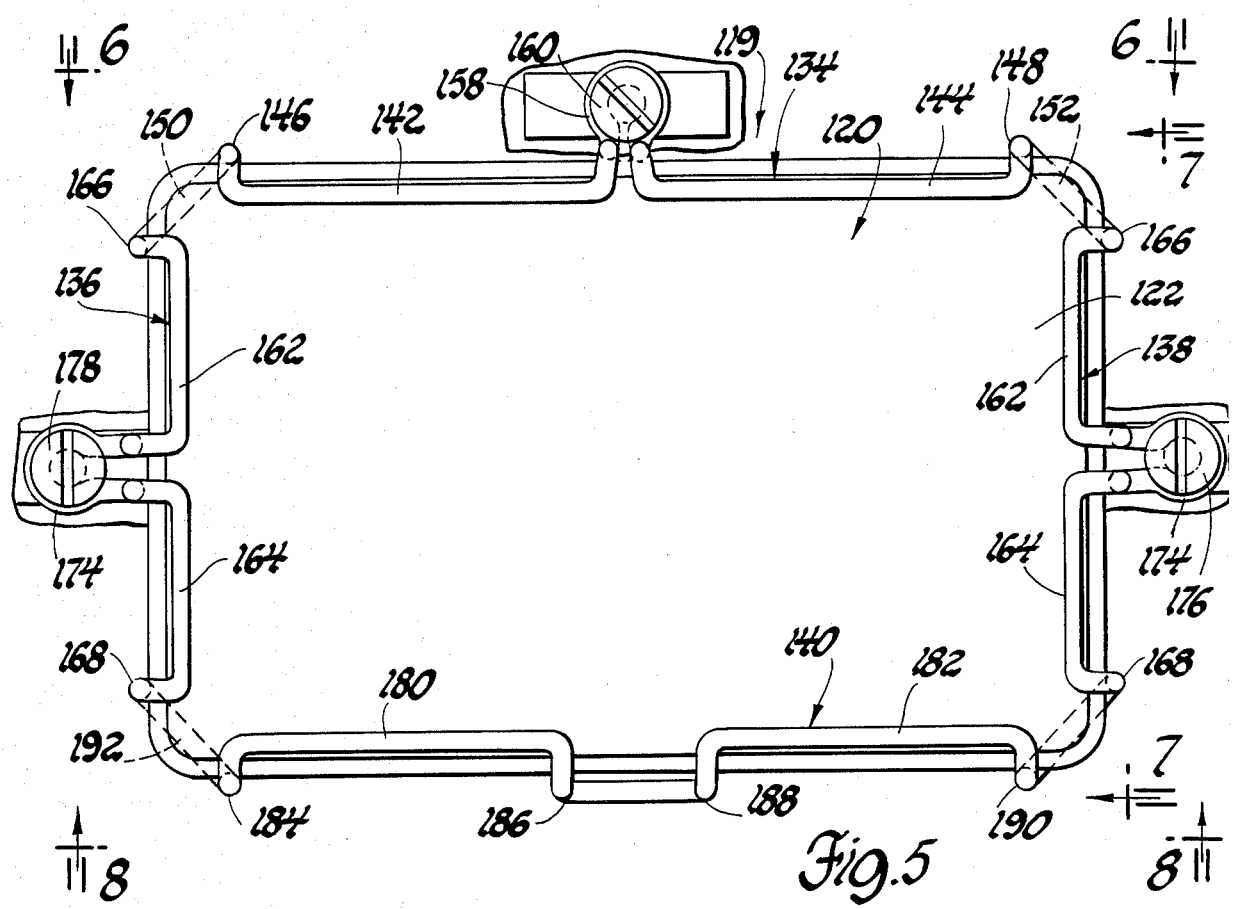
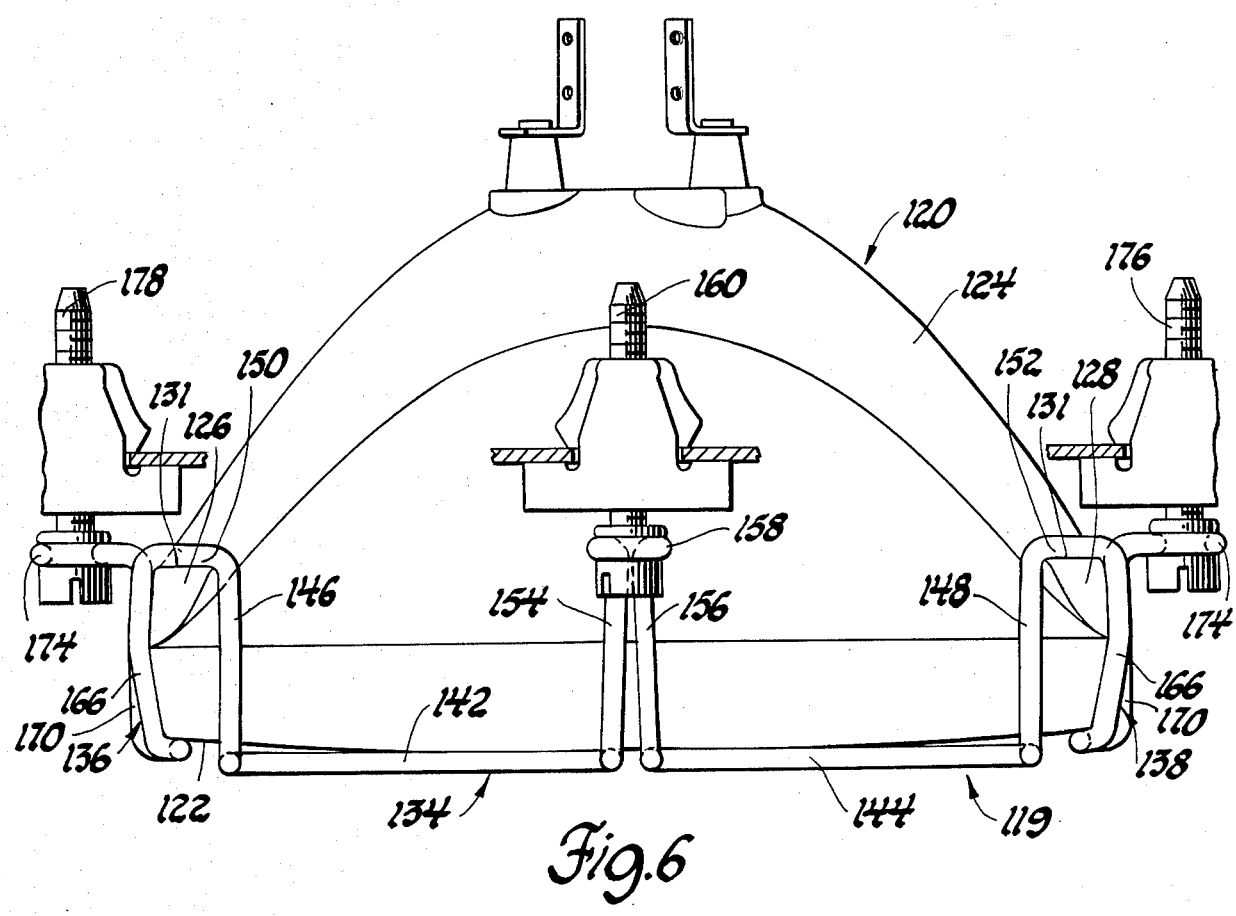

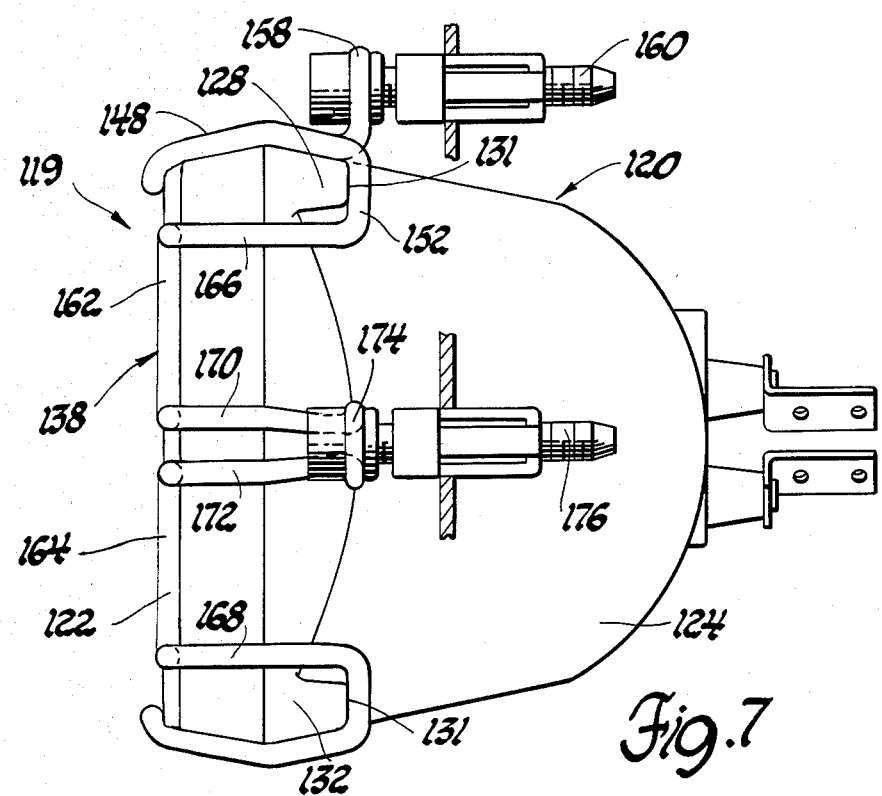
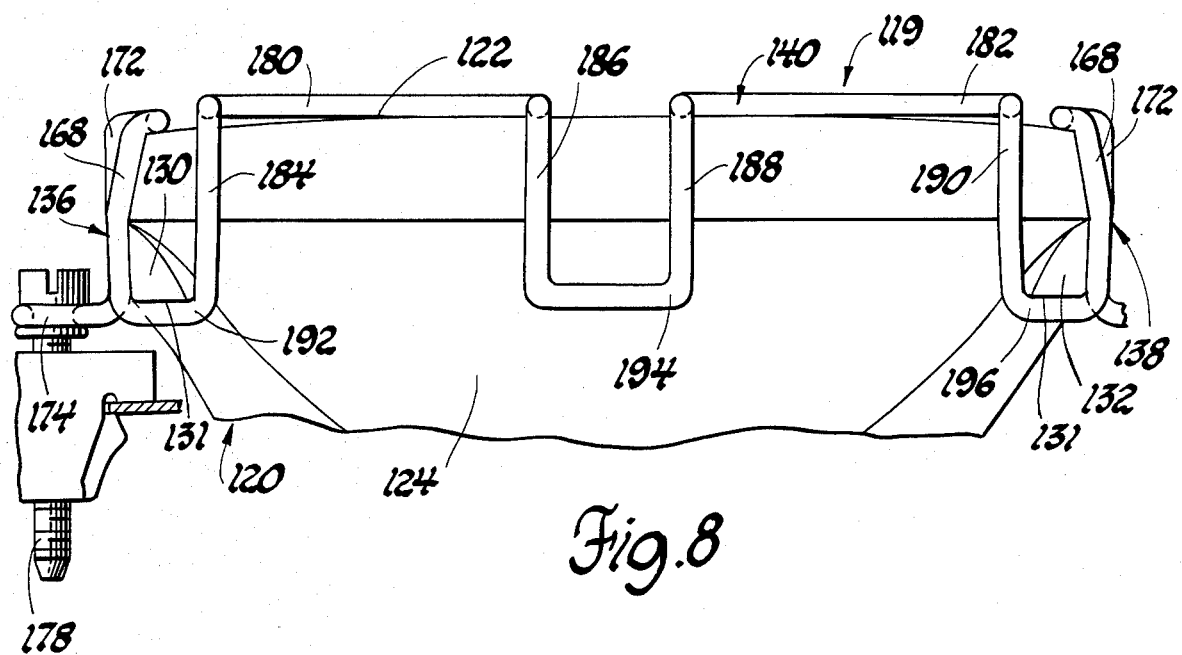

SUPPORT DEVICE FOR A VEHICLE HEADLAMP

This invention relates to vehicle headlamps and more particularly to a support device for a headlamp that provides adjustable aiming movement of the headlamp relative to the vehicle.

More specifically, the support device according to the present invention is attachable to the frontal portion of a vehicle and adapted to support and provide adjustable aiming movement of a headlamp which includes a reflector and a lens, the latter of which is formed with a front wall portion that is substantially parallel to a rear wall portion formed on the reflector. The support device is characterized in that it takes the form of a single strand of wire which surrounds the peripheral portion of the headlamp adjacent the lens, and includes a plurality of spaced first wire sections located forwardly of the front wall portion and a plurality of spaced second wire sections located rearwardly of the rear wall portion is in staggered relationship with the first wire sections. A third wire section interconnects adjacent ends of each of the first and second wire sections and bridges the space therebetween so as to cause the aforesaid peripheral portion of the headlamp to be caged within and supported by the first, second and third wire sections. The support device also includes three loop-shaped wire sections which are connected to the second wire sections. Two of the loop-shaped wire sections lie along a first axis perpendicular and passing through the optical axis of the headlamp and the third loop-shaped wire section lies along a second axis perpendicular to the first axis and also passes through the optical axis. Each of the three loop-shaped wire sections carries an adjusting screw which is adapted to be threadably received by the frontal portion of the vehicle so that by rotating any one of the adjusting screws, the aim of the headlamp can be varied.

The objects of the present invention are to provide a new and improved support device for a vehicle headlamp that consists of a single strand of wire shaped in a zig-zag fashion so as to have a gripping engagement with a front and rear peripheral portion of the headlamp for supporting the latter and includes three loop-shaped sections which carry adjusting screws that serve to connect the support device to the vehicle; to provide a new and improved support device for a vehicle headlamp that is formed from a single strand of wire having staggered wire sections which are interconnected and located on the opposite sides of a radially extending flange formed in the headlamp and includes integrally formed loop-shaped sections which rotatably support adjusting screws for connecting the support device to the front end of the vehicle; and to provide a new and improved support device that consists of a wire which is shaped so as to have a gripping engagement with front and rear portions of the headlamp along the periphery of the lens and includes formed wire sections which rotatably carry adjusting screws.

Other objects and advantages of the present invention will be more apparent from the following detailed description when taken with the drawings in which:

FIG. 5 is a modified version of the support device according to the present invention employed with a headlamp having a slightly different peripheral configuration than the headlamp shown in FIGS. 1-4;

FIG. 6 is a plan view taken on line 6—6 of FIG. 5 and shows the top portion of the headlamp and of the modified support device;

FIG. 7 is a side elevational view of the modified support device taken on line 7—7 of FIG. 5; and FIG. 8 is a view taken on line 8—8 of FIG. 5 and shows the bottom portion of the modified support device.

Figure 1:
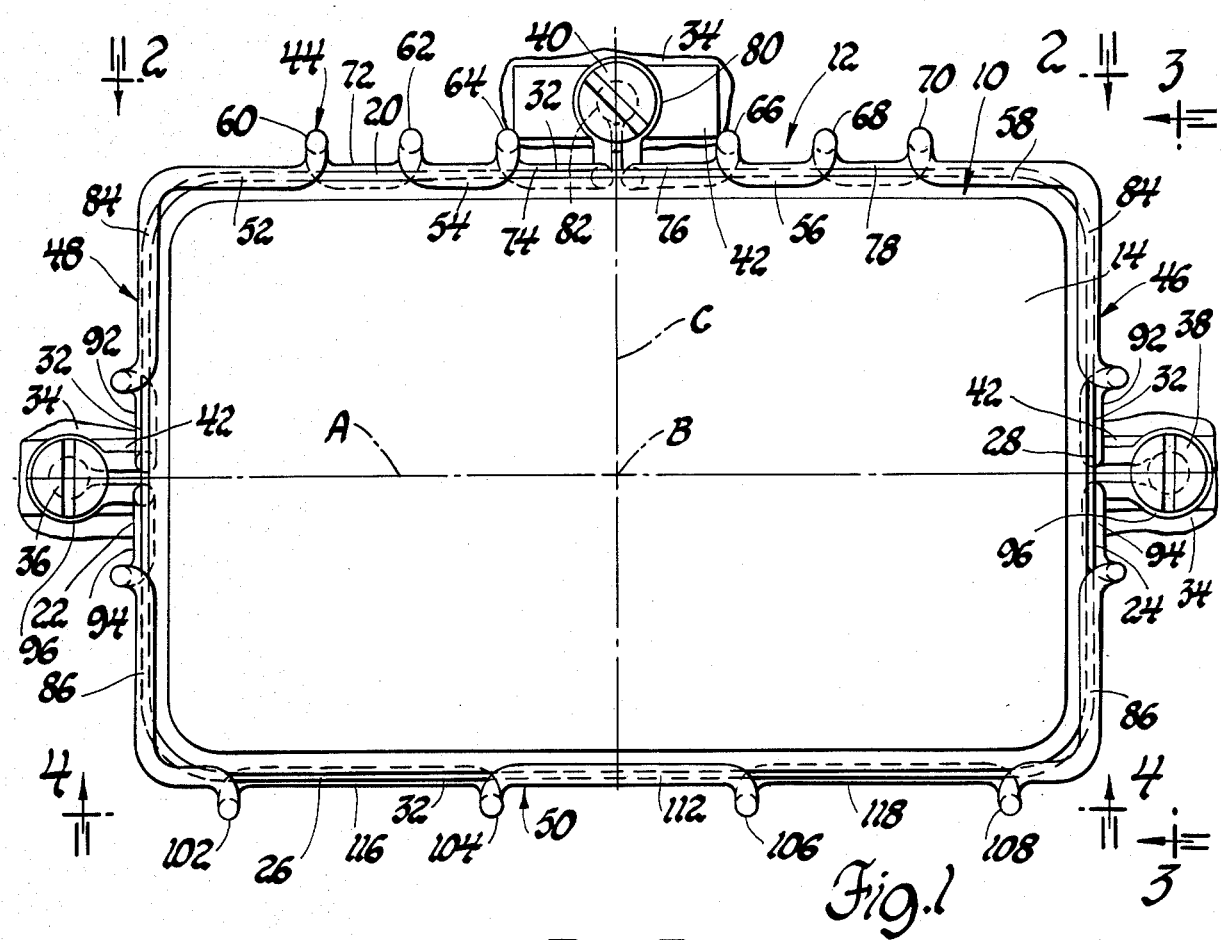
FIG. 1 is a front elevational view showing a rectangular headlamp supported by a support device made according to the present invention.
Figure 2:
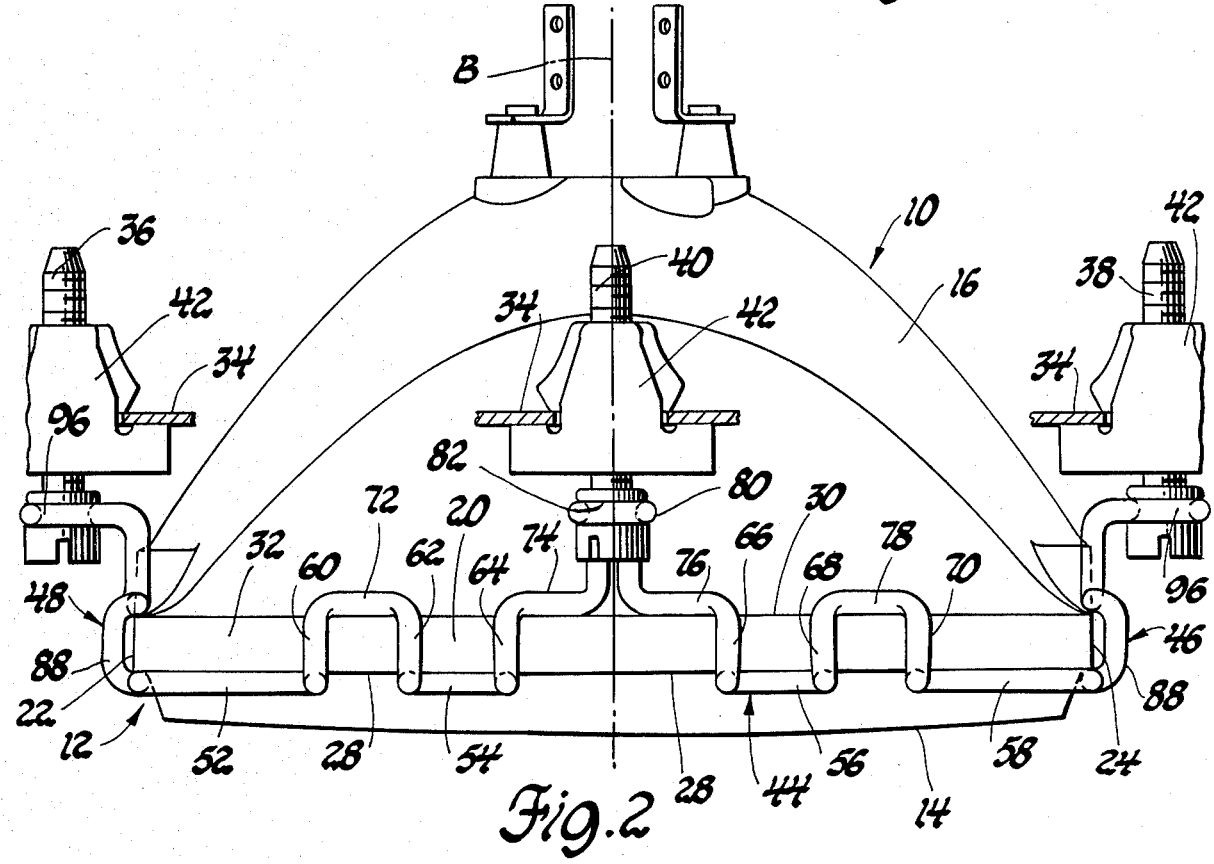
FIG. 2 is a plan view taken on line 2—2 of FIG. 1 and shows the top portion of the headlamp and of the support device.

Referring to the drawings and more particularly FIGS. 1 and 2 thereof, a rectangular headlamp 10 is shown mounted within a support device 12 made in accordance with the present invention. The headlamp 10 includes the usual lens 14 and a reflector 16 bonded together at a radially extending flange which surrounds the frontal portion of the headlamp and consists of a top flange portion 20, a pair of side flange portions 22 and 24, and a bottom flange 26. Each flange portion 20-26 is defined by a front wall 28 and a parallel rear wall 30 which are interconnected by an end wall 32 that is perpendicular to the front and rear walls 28 and 30. The support device 12 serves to connect the headlamp 10 to the front sheet metal 34 of a vehicle through three identical adjusting screws 36, 38 and 40, each of which is threadably received by a plastic nut 42 secured to the sheet metal 34. Thus, when rotated about its longitudinal axis each screw 36-40 will cause movement of the headlamp 10 so that desired aiming thereof can be achieved.

More specifically, the support device 12 is made of a continuous single strand of metal wire having a uniform cross section and, as seen in FIGS. 1-4, includes a top member 44, a pair of identical side members 46 and 48, and a bottom member 50 all of which are interconnected to each other and cooperate to form a cage-like structure which encompasses the aforementioned flange of the headlamp 12 and supports the latter.

As seen in FIG. 2, the top member 44 includes horizontally oriented and axially aligned straight wire sections 52, 54, 56 and 58 connected by bridge wire sections 60, 62, 64, 66, 68 and 70 to horizontally oriented and axially aligned straight wire sections 72, 74, 76 and 78. The straight wire sections 52-58 are located adjacent to and in contact with the front wall 28 of top flange portion 20 while the straight wire sections 72-78 are located adjacent to and in contact with the rear wall 30 of the top flange portion 20. Also, as seen in FIGS. 2 and 3, the straight wire sections 74 and 76 are integral with a loop-shaped wire section 80 which substantially completely surrounds and rests within the usual circular groove 82 formed in the conventional headlamp adjusting screw 40 so as to retain the latter while allowing rotation thereof about its longitudinal axis.

Figure 3:
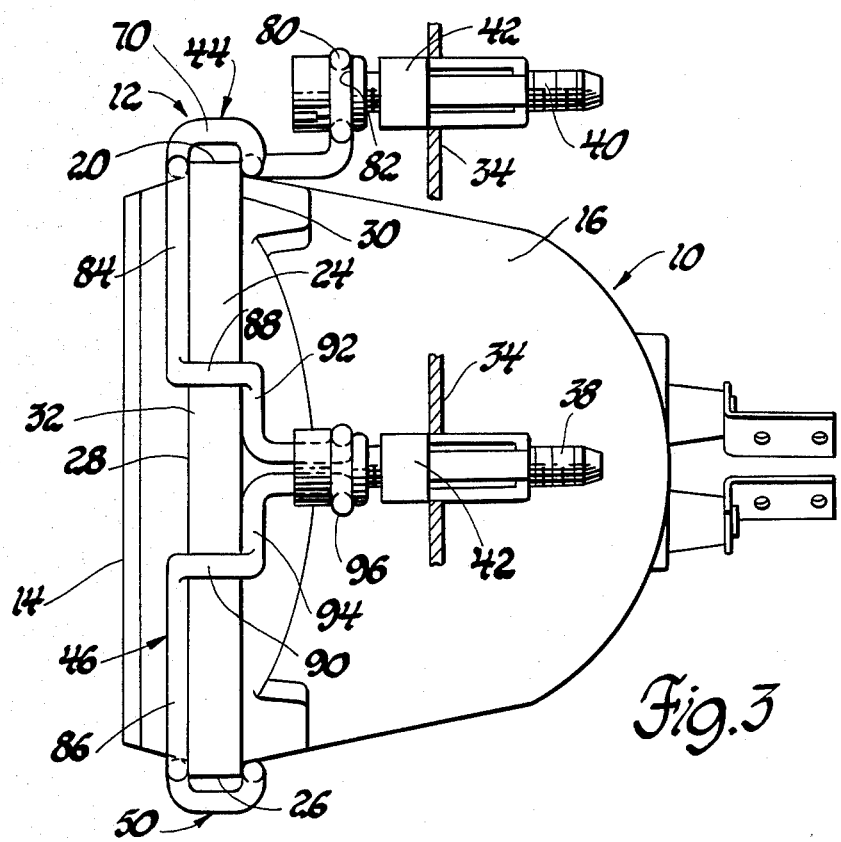
FIG. 3 is a side elevational view of the headlamp and the support device taken on line 3—3 of FIG. 1.

As aforementioned, the side members 46 and 48 are identical in construction and as seen in FIG. 3, the side member 46 and also side member 48 each includes a pair of vertically oriented and axially aligned straight wire sections 84 and 86 located adjacent to and in contact with the front wall 28 of the associated side flange portion. A pair of bridge wire sections 88 and 90 are integrally formed with wire sections 84 and 86 and serve to interconnect the latter with a pair of vertically oriented and axially aligned straight wire sections 92 and 94 which are integral with a loop-shaped wire section 96 which is identical to the loop-shaped wire section 80 and also carries an identical adjusting screw 38. Thus, the loop-shaped wire section 96 of the side member 46 includes adjusting screw 38 while the corresponding loop-shaped wire section 96 of the side member 48 includes the adjusting screw 36. Also, as seen in FIG. 1, the loop-shaped wire section of each side member 46 and 48 and of top member 44 is located midway between ends of the associated member, and the two loop-shaped wire sections 96 are located along a horizontal axis A which passes through the optical axis B of the headlamp 10 while the loop-shaped wire section 80 is located along the vertical axis C which is perpendicular to the axis A and also passes through optical axis B.

Figure 4:
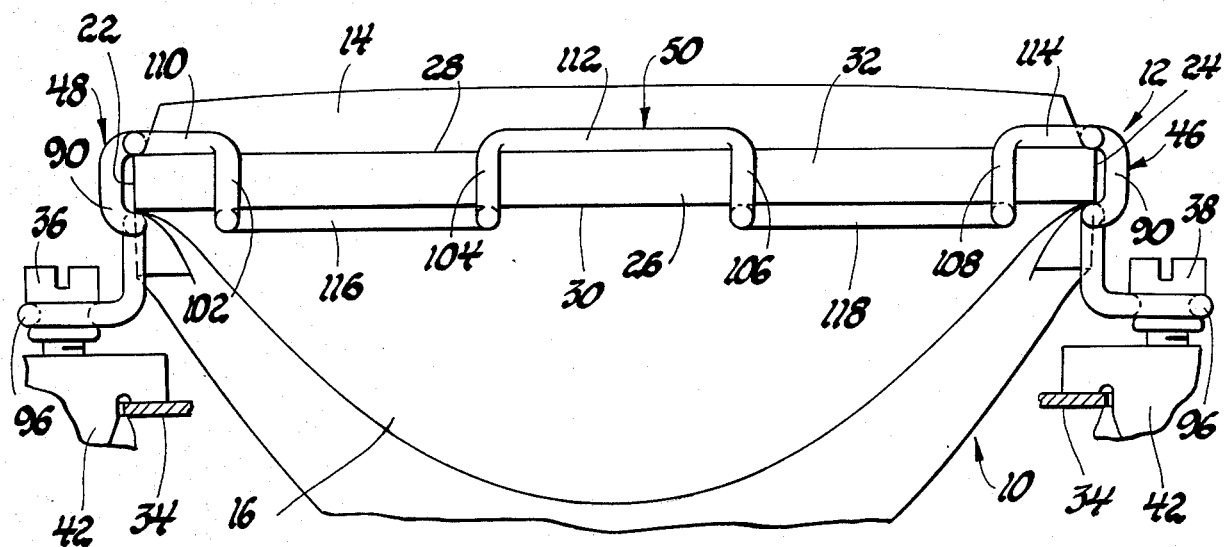
FIG. 4 is a plan view taken on line 4—4 of FIG. 1 and shows the bottom portion of the headlamp and of the support device.

As with the top member 44, the bottom member 50 interconnects the side members 46 and 48, and as seen in FIG. 4, includes wire sections located adjacent to and in contact with the front wall 28 of the bottom flange portion 26. More specifically, the bottom member 50 is formed with bridge wire sections 102, 104, 106 and 108 which interconnect horizontally oriented and axially aligned straight wire sections 110, 112, and 114 with axially aligned and horizontally oriented straight wire sections 116 and 118. The sections 110-114 are adjacent to and in contact with the front wall 28 of the bottom flange portion 26 while the sections 116 and 118 are located adjacent to and in contact with the rear wall 30 of the bottom flange portion 26.

It will be noted that as seen in FIGS. 1-4, each of the straight wire sections of the top member 44, the side members 46 and 48, and the bottom member 50 has a portion thereof that extends radially inwardly from the associated end wall 32. Thus, the straight wire sections cooperate with the associated bridge wire sections to, in effect, cage the entire flange surrounding the headlamp and thereby house or support the headlamp 10 in a fixed position so that when the adjusting screws 36-40 are threaded into the nuts 42 fixed to the sheet metal 34 of the vehicle, the headlamp 10 maintains its aimed position. If the headlamp 10 requires re-aiming, the adjusting screws 36-40 can be independently rotated in the usual manner to provide the desired aim.

It will also be noted that the length of the straight wire sections associated with the top member 44, side members 46 and 48, and bottom member 50 can be varied as shown in the drawings or made of substantially equal length. The important consideration being that the wire be of a diameter that readily allows the required bending to provide the zig-zag or sinuous configuration as seen in FIGS. 2 and 3 and also have sufficient strangth to support the headlamp 10. In addition, and as should be apparent, in forming the support device 12 as described above and shown in FIGS. 1-4, the support device 12 should have a certain amount of resiliency which will allow sufficient movement so that the top, side and bottom members will allow the headlamp 10 to be inserted into and removed from the support device 12 with a "snap" action.

FIGS. 5-8 show a modified version of the support device 12 according to the present invention. This modified support device 119 is used for supporting and aiming a rectangular headlamp 120 having a peripheral configuration adjacent the lens that differs somewhat from the peripheral configuration of the headlamp 10.

In this regard, it will be noted that the headlamp 120 includes the usual lens 122 which is bonded to a reflector 124, the rear portion of which is formed with four identical seating pads 126, 128, 130 and 132, each of which is located adjacent one of the corners of the headlamp 120 and has a rear wall portion 131 that is substantially parallel to the face of the lens 122. The circumferential flange found in the headlamp 10 is not present in the headlamp 120, instead however, the face of the lens 122, together with the seating pads 126-132, in effect, provides a flange portion with which the support device 119 cooperates in the maintaining the headlamp 120 in a fixed position and providing aiming adjustment thereof.

As in the case of the support device 12, the support device 119 is made of a single strand of wire having a uniform cross section and includes a top member 134, a pair of side members 136 and 138, and a bottom member 140 all of which are interconnected to each other and form a cage-like structure which surrounds the peripheral portion of headlamp 120.

As seen in FIG. 6, the top member 134 includes horizontally oriented and axially aligned straight wire sections 142 and 144 connected by bridge wire sections 146 and 148 to inclined straight wire sections 150 and 152. The straight wire sections 142 and 144 are located adjacent to and in contact with the front face of the lens 122 while the straight wire sections 150 and 152 are located adjacent to and in contact with the rear wall portion 131 of the seating pads 126 and 128 respectively. Also, as seen in FIGS. 6 and 7, the straight wire sections 142 and 144 are connected through converging wire members 154 and 156 to a loop-shaped wire section 158 which substantially completely surrounds and rests within the usual circular groove formed in a conventional headlamp adjusting screw 160 so as to retain the latter while allowing rotation thereof about its longitudinal axis.

The side members 136 and 138 are identical in construction and as seen in FIGS. 5 and 7, the side member 136 and also the side member 138 each includes a pair of vertically oriented and axially aligned straight wire sections 162 and 164 located adjacent to and in contact with the front face of the lens 122. A pair of bridge wire sections 166 and 168 are integrally formed with the wire sections 162 and 164, respectively, and the wire sections 166 serve to interconnect the side members 136 and 138 to the wire sections 150 and 152 of the top member 134. Also, the sections 162 and 164 are connected through converging wire members 170 and 172 with a loop-shaped wire section 174 which is identical to the loop-shaped wire section 158 and also carries an adjusting screw 176. Thus, the loop-shaped wire section 174 of the side member 138 includes adjusting screw 176 while the corresponding loop-shaped wire section 174 of the side member 136 includes an identical adjusting screw 178. In addition, as seen in FIG. 5, the loop-shaped wire section of each side member 136 and 138 and of top member 134 is located midway between ends of the associated member and are located relative to the optical axis of the headlamp 120 in the same manner as the corresponding loop-shaped wire sections of headlamp 10 are located relative its optical axis B.

The bottom member 140 interconnects the bottom portions of side members 136 and 138, and as seen in FIGS. 5 and 8, includes horizontally oriented and axially aligned straight wire sections 180 and 182 located adjacent to and in contact with the front face of the lens 122. The bottom member 140 also is formed with bridge wire sections 184, 186, 188 and 190 which interconnect the horizontally oriented axially aligned straight wire sections 180 and 182 with axially aligned horizontally oriented straight wire sections 192, 194 and 196. The sections 192 and 196 are adjacent to and in contact with th rear wall portion 131 of the seating pads 130 and 132.

It will be noted that as in the case of the corresponding sections of the support device 12, each of the straight wire sections of the top member 134, side members 136 and 138 and bottom member 140, at the face of the lens 122, is located radially inwardly from the periphery of the lens. Thus, the straight wire sections at the face of the lens cooperate with the associated bridge wire sections and the straight wire sections at the rear wall portions of the seating pads to, in effect, cage the headlamp 120 and thereby support the headlamp 120 in a fixed position so that when the adjusting screws 160, 176, and 178 are threaded into the associated nuts fixed to the sheet metal of the vehicle, the headlamp 120 maintains its aimed position. If the headlamp 120 requires reaiming, the adjusting screws 160, 176, and 178 can be independently rotated in the usual manner to provide the desired aim of the headlamp 120.

Various changes and modifications can be made in this construction without departing from the spirit of the invention. Such changes and modifications are contemplated by the inventor and he does not wish to be limited except by the scope of the appended claims.

The embodiments of the invention in which an exclusive property or privilege is claimed are defined as follows:

1. A support device attachable to a vehicle body at the front end thereof and adapted to support and provide adjustable aiming movement of a headlamp formed with a radially extending flange surrounding the headlamp adjacent the periphery thereof, said flange being defined by substantially parallel front and rear walls each of which lies in a plane substantially perpendicular to the optical axis of said headlamp, said support device comprising a wire of substantially uniform cross section encompassing said flange and being formed with a plurality of spaced first wire sections located adjacent said front wall and a plurality of spaced second wire sections located adjacent the rear wall in staggered relationship with said first wire sections, said first and said second wire sections each having a portion thereof located radially inwardly from said flange towards said optical axis, a third wire section interconnecting adjacent ends of each of said first and second wire sections and bridging said flange so as to cause the latter to be gripped by the and supported by said first and second wire sections, and three loop wire sections connected to said second wire sections, two of said loop-shaped wire sections lying along a first axis perpendicular of said optical axis of said headlamp and the third loop-shaped wire section lying along a second axis perpendicular to said first axis and passing through said optical axis, an adjusting screw carried by each of said three loop-shaped wire sections and adapted to be threadably received by said vehicle for adjusting the aim of said headlamp.

2. A support device attachable to a vehicle body at the front end thereof and adapted to support and provide adjustable aiming movement of a headlamp formed with a radially extending flange surrounding the lens of said headlamp, said flange being defined by substantially parallel front and rear walls each of which lies in a plane substantially perpendicular to the optical axis of said headlamp, an end wall connecting said front and rear walls and being located in a plane substantially parallel to said optical axis, said support device comprising a wire encompassing said flange and being formed with a plurality of spaced first wire sections located adjacent said front wall and a plurality of spaced second wire sections located adjacent the rear wall in staggered relationship with said first wire sections, said first and said second wire sections each having a portion thereof located radially inwardly from said end wall of said flange towards said optical axis, a third wire section interconnecting adjacent ends of each of said first and second wire sections and bridging said end wall of said flange so as to cause the latter to be caged within and supported by said first, second and third wire sections, and three loop wire sections connected to said second wire sections, two of said loop wire sections lying along a first axis perpendicular to said optical axis of said headlamp and the third loop wire section lying along a second axis perpendicular to said first axis and passing through said optical axis and an adjusting screw carried by each of said three loop wire sections and adapted to be threadably received by said front end of said vehicle for adjusting the aim of said headlamp upon rotation and said adjusting screw.

3. A support device attachable to a vehicle body at the front end thereof and adapted to support and provide adjustable aiming movement of a headlamp which includes a reflector and a lens, said lens being attached to the reflector so as to provide a front wall portion adjacent the periphery of the lens and a rear wall portion on the reflector, said front and rear wall portion being substantially parallel to each other and lying in planes substantially perpendicular to the optical axis of said headlamp, said support device comprising a wire encompassing said headlamp and being formed with a plurality of spaced first wire sections located adjacent to and in front of said front wall portion and a plurality of spaced second wire sections located adjacent to and to the rear of the rear wall portion in staggered relationship with said first wire sections, a third wire section interconnecting adjacent ends of each of said first and second wire sections and bridging the space between said first and second wire sections so as to cause the periphery of the headlamp to be caged within and supported by said first, second, and third wire sections, and three loop-shaped wire sections connected to said second wire sections, two of said loop-shaped wire sections lying along a first axis perpendicular of said optical axis of said headlamp and the third loop-shaped wire section lying along a second axis perpendicular to said first axis and passing through said optical axis, and an adjusting screw carried by each of said three loop-shaped wire sections and adapted to be threadably received by said front end of said vehicle for adjusting the aim of said headlamp upon rotation of said adjusting screw.

* * * * *